(12) United States Patent
Basset et al.

(10) Patent No.: US 10,632,457 B2
(45) Date of Patent: Apr. 28, 2020

(54) BI-METALLIC CATALYSTS, METHODS OF MAKING, AND USES THEREOF

(71) Applicant: King Abdullah University of Science and Technology, Thuwal (SA)

(72) Inventors: Jean-Marie Basset, Thuwal (SA); Manoja K. Samantaray, Thuwal (SA); Raju Dey, Thuwal (SA); Edy Abou-Hamad, Thuwal (SA); Santosh Kavitake, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 79 days.

(21) Appl. No.: 15/744,226

(22) PCT Filed: Jul. 12, 2016

(86) PCT No.: PCT/IB2016/054161
§ 371 (c)(1),
(2) Date: Jan. 12, 2018

(87) PCT Pub. No.: WO2017/009778
PCT Pub. Date: Jan. 19, 2017

(65) Prior Publication Data
US 2018/0200702 A1    Jul. 19, 2018

Related U.S. Application Data

(60) Provisional application No. 62/191,755, filed on Jul. 13, 2015.

(51) Int. Cl.
*C01B 3/58* (2006.01)
*B01J 31/12* (2006.01)
*B01J 31/16* (2006.01)

(52) U.S. Cl.
CPC .......... *B01J 31/121* (2013.01); *B01J 31/122* (2013.01); *B01J 31/1625* (2013.01); *B01J 2231/543* (2013.01)

(58) Field of Classification Search
None
See application file for complete search history.

(56) References Cited

U.S. PATENT DOCUMENTS

| 4,508,850 A | 4/1985 | Banks |
| 2008/0293895 A1 | 11/2008 | Kao |

FOREIGN PATENT DOCUMENTS

| CN | 103962152 | 8/2014 |
| WO | 2015079321 | 6/2015 |

OTHER PUBLICATIONS

Rataboul et al. (Dalton Trans., 923-927 (Year: 2007).*
Basset, et al., "Metathesis of Alkanes and Related Reactions", Accounts of Chemical Research, vol. 43, No. 2, Feb. 16, 2010, pp. 323-334.
Samantaray, et al., "Synergy between Two Metal Catalysts: A Highly Active Silica-Supported Bimetallic M/Zr Catalyst for Metathesis of n-Decane", Journal of the Americal Chemical Society, vol. vol. 138, No. 27, Jul. 13, 2016, pp. 8595-8602.
Notification of Transmittal of the International Search Report and the Written Opinion of the International Searching Authority, or the Declaration for PCT/IB2016/054161 dated Nov. 16, 2016.
Ahuja, et al., "Catalytic ring expansion, contraction, and metathesis-polymerization of cycloalkanes", Chem. Commun., 2008, 253-255.
Burnett, et al., "Mechanism and Poisoning of the Molecular Redistribution Reaction of Alkanes with a Dual-Functional Catalyst System", Journal of Catalysis 31, 55-64 (1973).
Goldman, et al., "Catalytic Alkane Metathesis by Tandem Alkane Dehydrogenation-Olefin Metathesis", Science, 312, Apr. 14, 2006, pp. 257-261.
Haibach, et al., "Alkane Metathesis by Tandem Alkane-Dehydrogenation-Olefin-Metathesis Catalysis and Related Chemistry", Accounts of Chemical Research, vol. 45, 2012, pp. 947-958.
Samantaray, et al., "WMe6 Tamed by Silica: Si-O-WMe5 as an Efficient, Well-Defined Species for Alkane Metathesis, Leading to the Observation of a Supported W-Methyl/Methylidyne Species", J. Am. Chem. Soc. 2014, 136, 1054-1061.
Schrock, "Recent Advances in High Oxidation State Mo and W Imido Alkylidene Chemistry", Chem. Rev. 2009, 109, 3211-3226.
Shortland, et al., "Hexamethyltungsten", J.C.C. Chem. Comm., 1972, p. 318.
Vidal, et al., "Metathesis of Alkanes Catalyzed by Silica-Supported Transition Metal Hydrides", Science, vol. 276, Apr. 4, 1997, pp. 99-102.

* cited by examiner

*Primary Examiner* — Yun Qian
(74) *Attorney, Agent, or Firm* — Billion & Armitage; Lisbeth C. Robinson

(57) ABSTRACT

Provided herein are bi-metallic catalysts, methods of making, and uses thereof. In some embodiments, the bi-metallic catalyst contains two different metal catalysts that can be used in hydrocarbon metathesis reactions, in some embodiments, the methods of making the bi-metallic catalysts can include two steps utilizing a surface organometallic chemistry approach in which the two different metal catalysts are sequentially grafted onto a support.

11 Claims, 8 Drawing Sheets

| Entry | Catalysts | TON |
|---|---|---|
| 1 | (3) | 150 |
| 2 | (4) | 0 |
| 3 | (1) | 560 |
| 4 | (5) | 543 |
| 5 | (2) | 1460 |

FIG. 6

BI-METALLIC CATALYSTS, METHODS OF MAKING, AND USES THEREOF

CROSS-REFERENCE TO RELATED APPLICATIONS

This application is a National Stage Application of PCT/IB2016/054161, filed on Jul. 12, 2016, which claims the benefit of and priority to U.S. Provisional Patent Application No. 62/191,755, filed on Jul. 13, 2015, entitled "BI-METALLIC CATALYSTS, METHODS OF MAKING, AND USES THEREOF," the contents of which is incorporated by reference herein in its entirety.

BACKGROUND

Alkanes are the major components of petroleum. Due to the dwindling natural oil reserves there are increasing efforts in developing petroleum from other natural sources via synthetic reactions, such as the Fischer-Tropsch process. Unfortunately, neither natural sources nor Fischer-Tropsch production yield alkane mixtures with a tightly controlled molecular weight distribution. Further, Fischer-Tropsch production yields a products having low molecular weights and there is no practical method for the interconversion of alkanes to give products of high molecular weights. As such, there is an ongoing need for improved materials and methods for the production of alkanes for use in, inter alia, the production of petroleum.

SUMMARY

Provided herein are methods that can contain the step of sequentially or not sequentially grafting a first organometallic complex and a second organometallic complex to a suitable support to form a bi-metallic catalyst, where the first organometallic complex contains a different metal than the second organometallic complex. In any one or more aspects, the first organometallic complex can contain a group IV metal. The second organometallic complex can contain a metal from group V, VI, VI, or VIII. The first organometallic complex and the second organometallic complex can each contain an alkyl, alkylidene, alkylidyne, a bis-alkylidene, a dialkylamide, or a halogen. The suitable support can be a metal oxide selected from the group of: silica, silica-alumina, γ-alumina, a porous silica, a zeolite, a porous zeolite, and a combinations thereof. The method can further include the step of treating the bi-metallic catalyst with $H_2$ to form a corresponding bi-metallic hydride catalyst.

Also provided herein is a catalyst. The catalyst can contain a first organometallic complex, where the first organometallic complex contains a first metal; a second organometallic complex, where the second organometallic complex contains a second metal, where the second metal is different than the first metal; and a suitable support, where the first organometallic complex and the second organometallic complex are grafted to the suitable support. The first metal can be a group IV metal. The second metal can be a group V, VI, VI, or VIII metal. The suitable support can be a metal oxide selected from the group of silica, silica-alumina, γ-alumina, a porous silica, a zeolite, a porous zeolite, and a combinations thereof. The catalyst can be a corresponding hydride catalyst of any one of above-described catalysts.

Also provided herein are metathesis methods that can include the step of reacting a catalyst or its corresponding hydride catalyst with a hydrocarbon. In any one or more aspects, the hydrocarbon can be an alkane and the step of reacting the catalyst according to any one of the catalysts or corresponding hydride catalysts described herein with the alkane forms gasoline. The hydrocarbon can be an ethylene and the step of reacting the catalyst or corresponding hydride catalyst with the ethylene forms propylene. The hydrocarbon can be a butene and the step of reacting the catalyst or corresponding hydride catalyst with the butene forms propylene. The hydrocarbon can be a saturated or unsaturated $C_1$-$C_{30}$ hydrocarbon. The hydrocarbon can be selected from a group of a $C_1$-$C_{30}$ alkane, a $C_2$-$C_{30}$ alkene, a $C_2$-$C_{30}$ alkyne, and a combination thereof; wherein each hydrocarbon is linear, branched, cyclic, and/or aromatic. The hydrocarbon can be selected from a group consisting of: methane ethylene, n-butane, iso-butane, butene, decane, cyclooctane, 1-decene, 1-decyne, and combinations thereof. The step of reacting the catalyst or corresponding hydride catalyst as described herein with a hydrocarbon produces about 1% to about 1000% or more TON of product in the metathesis reaction as compared to a metathesis reaction without the catalyst or corresponding hydride catalyst as described herein.

BRIEF DESCRIPTION OF THE DRAWINGS

Further aspects of the present disclosure will be readily appreciated upon review of the detailed description of its various embodiments, described below, when taken in conjunction with the accompanying drawings.

FIG. 6 shows a summary of the TONs achieved from alkane metathesis using various catalysts.

DETAILED DESCRIPTION

Figures 1A, 1B:
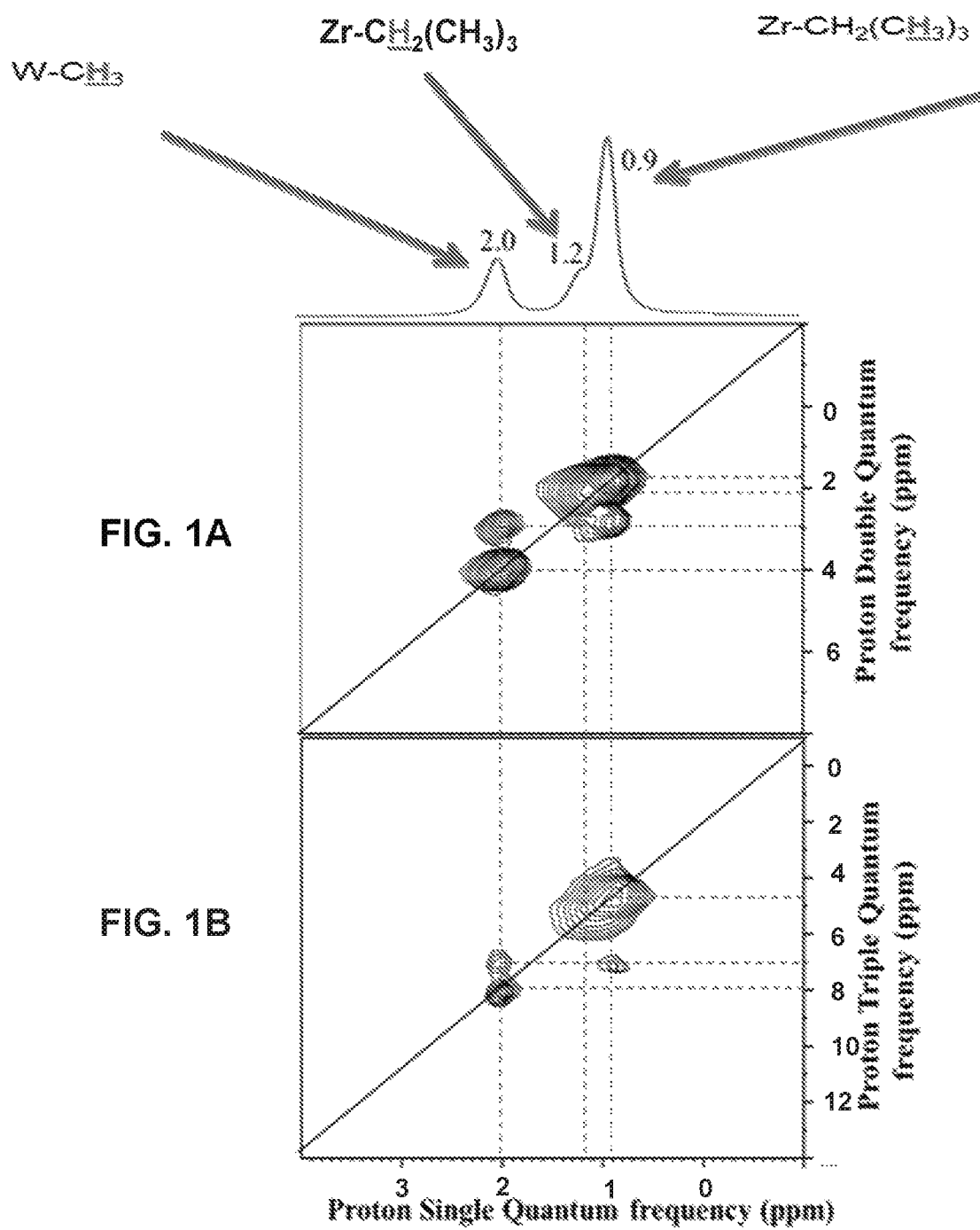
FIGS. 1A-1C show graphs demonstrating the results from NMR characterization for a bi-metallic catalyst ([WMe$_5$] and [ZrNp$_3$] grafted together on a silica surface). The first bar in each grouping of four represents data at 1 day, the second bar in each grouping of four represents data at 3 days, the third bar in each grouping of four represents data at 7 days, and the fourth bar in each grouping of four represents data at 5 days.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'" includes "about 'x' to about 'y'".

Embodiments of the present disclosure will employ, unless otherwise indicated, techniques of molecular biology, microbiology, nanotechnology, inorganic chemistry, organic chemistry, biochemistry, chemical engineering and the like, which are within the skill of the art. Such techniques are explained fully in the literature.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

As used herein, "about," "approximately," and the like, when used in connection with a numerical variable, generally refers to the value of the variable and to all values of the variable that are within the experimental error (e.g., within the 95% confidence interval for the mean) or within ±10% of the indicated value, whichever is greater.

As used herein, "organometallic" refers to a compound that contains an organic compound and a metal.

As used herein, "alkyl" refers to the radical of saturated aliphatic groups (i.e., an alkane with one hydrogen atom removed), including straight-chain alkyl groups, branched-chain alkyl groups, cycloalkyl (alicyclic) groups, alkyl-substituted cycloalkyl groups, and cycloalkyl-substituted alkyl groups.

As used herein, a straight chain or branched chain alkyl has 30 or fewer carbon atoms in its backbone (e.g., $C_1$-$C_{30}$ for straight chains, and $C_3$-$C_{30}$ for branched chains), preferably 20 or fewer, more preferably 15 or fewer, most preferably 10 or fewer. Likewise, preferred cycloalkyls have 3-10 carbon atoms in their ring structure, and more preferably have 5, 6, or 7 carbons in the ring structure. The term "alkyl" (or "lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, phosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, more preferably from one to six carbon atoms in its backbone structure. Likewise, "lower alkenyl" and "lower alkynyl" have similar chain lengths. Throughout the application, preferred alkyl groups are lower alkyls. In preferred embodiments, a substituent designated herein as alkyl is a lower alkyl.

It will be understood by those skilled in the art that the moieties substituted on the hydrocarbon chain can themselves be substituted, if appropriate. For instance, the substituents of a substituted alkyl may include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Cycloalkyls can be substituted in the same manner.

As used herein "heteroalkyl" refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

As used herein, "alkylthio" refers to an alkyl group, as defined above, having a sulfur radical attached thereto. In some embodiments, the "alkylthio" moiety is represented by one of —S-alkyl, —S-alkenyl, and —S-alkynyl. Representative alkylthio groups include methylthio, ethylthio, and the like. The term "alkylthio" also encompasses cycloalkyl groups, alkene and cycloalkene groups, and alkyne groups. "Arylthio" refers to aryl or heteroaryl groups. Alkylthio groups can be substituted as defined above for alkyl groups.

As used herein, "alkenyl" and "alkynyl", refer to unsaturated aliphatic groups analogous in length and possible substitution to the alkyls described above, but that contain at least one double or triple bond, respectively.

As used herein, "alkoxyl" or "alkoxy" refer to an alkyl group, as defined above, having an oxygen radical attached thereto. Representative alkoxyl groups include methoxy, ethoxy, propyloxy, tert-butoxy and the like. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, and —O— alkynyl. The terms "aroxy" and "aryloxy", as used interchangeably herein, can be represented by —O-aryl or O-heteroaryl, wherein aryl and heteroaryl are as defined below. The alkoxy and aroxy groups can be substituted as described above for alkyl.

As used herein, "amine" and "amino" (and its protonated form) are art-recognized and refer to both unsubstituted and substituted amines, e.g., a moiety that can be represented by the general formula:

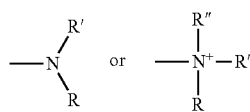

wherein R, R', and R" each independently represent a hydrogen, an alkyl, an alkenyl, —(CH2)$_m$—$R_C$ or R and R' taken together with the N atom to which they are attached complete a heterocycle having from 4 to 8 atoms in the ring structure; $R_C$ represents an aryl, a cycloalkyl, a cycloalkenyl, a heterocycle or a polycycle; and m is zero or an integer in the range of 1 to 8. In preferred embodiments, only one of R or R' can be a carbonyl, e.g., R, R' and the nitrogen together do not form an imide. In still more preferred embodiments, the term "amine" does not encompass amides, e.g., wherein one of R and R' represents a carbonyl. In even more preferred embodiments, R and R' (and optionally R") each independently represent a hydrogen, an alkyl or cycloakly, an alkenyl or cycloalkenyl, or alkynyl. Thus, the term "alkylamine" as used herein means an amine group, as defined above, having a substituted (as described above for alkyl) or unsubstituted alkyl attached thereto, i.e., at least one of R and R' is an alkyl group.

As used herein, "amido" is art-recognized as an amino-substituted carbonyl and includes a moiety that can be represented by the general formula:

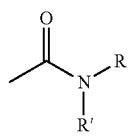

wherein R and R' are as defined above.

As used herein. "aryl" refers to $C_5$-$C_{10}$-membered aromatic, heterocyclic, fused aromatic, fused heterocyclic, biaromatic, or bihetereocyclic ring systems. Broadly defined, "aryl", as used herein, includes 5-, 6-, 7-, 8-, 9-, and 10-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine, pyrimidine, and the like. Those aryl groups having heteroatoms in the ring structure may also be referred to as "aryl heterocycles" or "heteroaromatics". The aromatic ring can be substituted at one or more ring positions with one or more substituents including, but not limited to, halogen, azide, alkyl, aralkyl, alkenyl, alkynyl, cycloalkyl, hydroxyl, alkoxyl, amino (or quaternized amino), nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, and combinations thereof.

As used herein, "aryl" also includes polycyclic ring systems having two or more cyclic rings in which two or more carbons are common to two adjoining rings (i.e., "fused rings") wherein at least one of the rings is aromatic, e.g., the other cyclic ring or rings can be cycloalkyls, cycloalkenyls, cycloalkynyls, aryls and/or heterocycles. Examples of heterocyclic rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl. One or more of the rings can be substituted as defined above for "aryl".

As used herein, "aralkyl" refers to an alkyl group substituted with an aryl group (e.g., an aromatic or heteroaromatic group).

As used herein, "aralkyloxy" can be represented by —O-aralkyl, wherein aralkyl is as defined above.

As used herein, "carbocycle" refers to an aromatic or non-aromatic ring(s) in which each atom of the ring(s) is carbon.

As used herein, "heterocycle" or "heterocyclic", refers to a monocyclic or bicyclic structure containing 3-10 ring atoms, and preferably from 5-6 ring atoms, consisting of carbon and one to four heteroatoms each selected from the group consisting of non-peroxide oxygen, sulfur, and N(Y) wherein Y is absent or is H, O, (C$_1$-C$_{10}$) alkyl, phenyl or benzyl, and optionally containing 1-3 double bonds and optionally substituted with one or more substituents. Examples of heterocyclic rings include, but are not limited to, benzimidazolyl, benzofuranyl, benzothiofuranyl, benzothiophenyl, benzoxazolyl, benzoxazolinyl, benzthiazolyl, benztnazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxepanyl, oxetanyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydropyranyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl. Heterocyclic groups can optionally be substituted with one or more substituents at one or more positions as defined above for alkyl and aryl, for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, ether, alkylthio, sulfonyl, ketone, aldehyde, ester, a heterocyclyl, an aromatic or heteroaromatic moiety, —CF$_3$, —CN, or the like.

As used herein, "carbonyl" is art-recognized and includes such moieties as can be represented by the general formula:

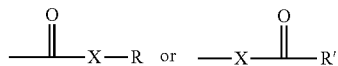

wherein X is a bond or represents an oxygen or a sulfur, and R and R' are as defined above. Where X is an oxygen and R or R' is not hydrogen, the formula represents an "ester". Where X is an oxygen and R is as defined above, the moiety is referred to herein as a carboxyl group, and particularly when R is a hydrogen, the formula represents a "carboxylic acid". Where X is an oxygen and R' is hydrogen, the formula represents a "formate". In general, where the oxygen atom of the above formula is replaced by sulfur, the formula represents a "thiocarbonyl" group. Where X is a sulfur and R or R' is not hydrogen, the formula represents a "thioester." Where X is a sulfur and R is hydrogen, the formula represents a "thiocarboxylic acid." Where X is a sulfur and R' is hydrogen, the formula represents a "thioformate." On the other hand, where X is a bond, and R is not hydrogen, the above formula represents a "ketone" group. Where X is a bond, and R is hydrogen, the above formula represents an "aldehyde" group.

As used herein, "heteroatom" means an atom of any element other than carbon or hydrogen. Preferred heteroatoms are boron, nitrogen, oxygen, phosphorus, sulfur, and selenium. Other heteroatoms include silicon and arsenic.

As used herein, the term "nitro" means —NO$_2$; the term "halogen" designates —F, —Cl, —Br, or —I; the term "sulfhydryl" means —SH; the term "hydroxyl" means —OH; and the term "sulfonyl" means —SO$_2$—.

As used herein, "substituted" refers to all permissible substituents of the compounds described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, C$_3$-C$_{20}$ cyclic, substituted C$_3$-C$_{20}$ cyclic, heterocyclic, substituted heterocyclic, amino acid, peptide, and polypeptide groups.

As discussed herein, heteroatoms such as nitrogen may have hydrogen substituents and/or any permissible substituents of organic compounds described herein which satisfy the valences of the heteroatoms. It is understood that "substitution" or "substituted" includes the implicit proviso that such substitution is in accordance with permitted valence of the substituted atom and the substituent, and that the substitution results in a stable compound, i.e., a compound that does not spontaneously undergo transformation such as by rearrangement, cyclization, elimination, etc.

Discussion

Any transformation of paraffin or methane to liquid paraffin is important for the energy industry. Alkanes are the major component of petroleum and alkane metathesis represents a powerful tool for making progress in a variety of areas, including the petroleum and petrochemical fields. Conversion of linear or cyclic alkanes to higher and lower homologous, namely alkane metathesis, is a promising valuable transformation in petrochemical and chemical industry. J. M. Basset, C. Coperet, D. Soulivong, M. Taoufik, J. T. Cazat, Acc. Chem. Res. 2010, 43, 323-334. Disproportionation of saturated hydrocarbons was initially discovered by employing two supported heterogeneous catalytic systems operating at high temperature. R. L. Burnett, T. R. Hughes, J. Catal. 1973, 31, 55-64. Later, it was found that silica supported tantalum mono and poly-hydrides and silica supported group VI poly-hydrides, prepared by surface organometallic chemistry can act as efficient multifunctional single site metal pre-catalysts for propane and higher alkane metathesis. V. Vidal, A. Theolier, J. ThivolleCazat, J. M. Basset, Science 1997, 276, 99-102. Variation of these formulations has been disclosed. All these catalysts employed so far used only one metal grafted on one support (either [Ta]/silica for example or [W]/alumina or silica). Interestingly, many other reactions have been observed with these catalysts, such as e.g. transformations of ethylene to propylene, butenes into propylene, cleavage of alkanes by methane, coupling of methane into ethane and hydrogen, transformation of butane to gasoline etc. J. M. Basset, C. Coperet, D. Soulivong, M. Taoufik, J. T. Cazat, Acc. Chem. Res. 2010, 43, 323-334.

Inspired by the early work in the dual catalysts system, a homogeneous tandem catalytic system for alkane metathesis reaction was reported by Brookhart and Goldman. A. S. Goldman, A. H. Roy, Z. Huang, R. Ahuja, W. Schinski, M. Brookhart, Science 2006, 312, 257-261. This catalytic process employs typically an iridium ligated pincer complex, for hydrogenation/dehydrogenation reactions, associated with a molybdenum Schrock-type catalyst for olefin metathesis reactions. Id. Variations of these systems have been published. M. C. Haibach, S. Kundu, M. Brookhart, A. S. Goldman, Acc. Chem. Res. 2012, 45, 947-958 and R. R. Schrock, Chem. Rev. 2009, 109, 3211-3226. They found that either linear alkanes (see A. S. Goldman, A. H. Roy, Z. Huang, R. Ahuja, W. Schinski, M. Brookhart, Science 2006, 312, 257-261) and cyclic alkanes (see R. Ahuja, S. Kundu, A. S. Goldman, M. Brookhart, B. C. Vicente, S. L. Scott, Chem. Commun. 2008, 253-255) are catalyzed into the corresponding lower and higher homologous. However, these systems are all homogeneous based systems. Heterogeneous catalysts for alkane metathesis have been claimed by Burnett and Hughes in the early 1970s (see R. L. Burnett, T. R. Hughes, J. Catal. 1973, 31, 55-64). These catalysts work at high temperature (>300° C.) and combine a [Pt] based catalyst for alkane dehydrogenation to olefins followed by a metathesis catalyst (typically $Re_2O_7$/alumina) and finally products olefin are hydrogenated by the [Pt]/alumina catalyst). In a recent disclosure Schrock et al. have used a combination of heterogeneous catalysts with a homogenous catalyst to carry out metathesis of alkanes.

With that said, described herein are bi-metallic catalysts, methods of making, and uses thereof. In some embodiments, the bi-metallic catalyst contains two different metal catalysts that can be used in hydrocarbon metathesis reactions. In some embodiments, the methods of making the bi-metallic catalysts can include two steps utilizing a surface organometallic chemistry approach in which the two different metal catalysts are sequentially grafted onto a support. The bi-metallic catalysts described herein can result in a higher production of transformed hydrocarbons than currently available catalysts, particularly those that include only a single metallic catalyst.

Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Bi-Metallic Catalysts

Described herein are bi-metallic catalysts and hydrides thereof that can contain simultaneously two different types organometallic catalysts grafted on or bound to the same suitable support (e.g., FIGS. 7A-7D). The amount of organometallic catalysts grafted on the suitable support can be about 1 to about 5% by weight of the suitable support. The bi-metallic catalysts and hydrides thereof described herein can produce about 1% to about 100% or more TON of product in an alkane metathesis reaction. The above said bi-metallic catalyst is very stable and very active with high TOFs with compared to the mono-metallic variant.

The suitable support can be a metal oxide having the general formula: $M'O_a$ (Formula 1), where a can be any integer (i.e. 1, 2, 3, . . . n), such that the $d^0$ configuration and oxidation state of the M' is maintained. In some embodiments, M' can be Si, Al, Zr, Ti, Nb. In some embodiments, the metal oxide can include silica, silica-alumina, γ-alumina, a porous silica (e.g. MCM-41 and SBA-15), a zeolite, a porous zeolite, and/or a combination thereof. In some embodiments, the suitable support contains a metal aminated oxide having the general formula: $M'NH_2$ (Formula 2), where M' can be as previously described.

The suitable support can be homogenous (i.e., the support contains only one type of metal oxide and/or metal amine). The suitable support can be heterogeneous (i.e., the support contains more than one type of metal oxide and/or metal amine). The suitable support can have a reactive oxide group and/or a reactive amide group on the surface of the support. The suitable support can be nonporous, porous, mesoporous or microporous crystalline or amorphous.

The suitable support can be pretreated at a temperature of about 200° C. to about 700° C. In some embodiments, the suitable support can be silica and the silica support is pretreated at about 200° C. or 700° C. In other embodiments where the support is a silica-alumina, or γ-alumina support, the support can be pretreated at about 500° C.

The bi-metallic catalyst can contain two different types of organometallics, (e.g. metal catalysts such as metal alkyl species). Each type of metal catalyst contained in the bi-metallic catalyst can be metal alkyl species, where the metal in the first type of metal catalyst is different from the metal in the second type of metal catalyst. Each type of metal catalyst can have a general formula according to any of Formulas 3 or 4, where M can be a Group IV, V, VI, VII, or VIII element, and where $R_1$ and $R_2$ can each independently be an alkyl, alkylidene, alkylidyne, a bis-alkylidene, a dialkylamide, or a halogen. In some embodiments, M is in its highest oxidation state. In some embodiments, the first type of metal catalyst contains tungsten (W) and the second type of metal catalyst contains zirconium (Zr). In various descriptions herein the first type of metal catalyst is shown by designating the metal (M) as $M_1$ and the second type of metal catalyst is shown by designating the metal (M) as $M_2$. In some embodiments $M_1$ is a Group IV metal and $M_2$ is a Group V or Group VI metal.

$$M(R_1)_b \quad \text{Formula 3:}$$

$$M(R_1)_b(R_2)_c \quad \text{Formula 4:}$$

$R_1$ can be a $C_1$-$C_4$ alkyl group, $C_1$-$C_4$ alkylidene group, a $C_1$-$C_4$ alkylidyne, a $C_1$-$C_4$ bis-alkylidene, a dialkylamide (—NR'R", where R' and R" each can be a $C_1$-$C_6$ alkyl or aryl group), or a halogen. $R_2$ can be a $C_1$-$C_4$ alkyl group, $C_1$-$C_4$ alkylidene group, a $C_1$-$C_4$ alkylidyne, a $C_1$-$C_4$ bis-alkylidene, a dialkylamide (—NR'R", where R' and R" each can be a $C_1$-$C_6$ alkyl or aryl group), or a halogen. B and C each can be any integer (i.e. 1, 2, 3, . . . n) such that the $d^0$ configuration and or oxidation state of M is maintained.

The bi-metallic catalyst can have a formula according to any one Formulas 5-9, where (≡M'Oa) can be a suitable oxide support, where $M_1$ and $M_2$ can be as described above, where $R_1$ and $R_2$ can be as described above, and x can be any integer (i.e. 1, 2, 3, . . . n), y can be any integer (i.e. 1, 2, 3 . . . n), and z can be any integer (i.e. 1, 2, 3, . . . n).

$$(\equiv M'O_a)_x[M_1(R_1)_b]_y[M_2(R_1)_b]_z \quad \text{Formula 5:}$$

$$(\equiv M'O_a)_x[M_1(R_1)_b]_y[M_2(R_2)_c]_z \quad \text{Formula 6:}$$

$$(\equiv M'O_a)_x[M_1(R_1)_b(R_2)_c]_y[M_2(R_1)_b]_z \quad \text{Formula 7:}$$

$$(\equiv M'O_a)_x[M_1(R_1)_b(R_2)_c]_y[M_2(R_2)_c]_z \quad \text{Formula 8:}$$

$$(\equiv M'O_a)_x[M_1(R_1)_b(R_2)_c]_y[M_2(R_1)_b(R_2)_c]_z \quad \text{Formula 9:}$$

The bi-metallic catalyst can have a formula according to any one Formulas 10-14, where (≡M'NH$_2$) can be a suitable oxide support, where $M_1$ and $M_2$ can be as described above, where $R_1$ and $R_2$ can be as described above, and x can be any integer (i.e. 1, 2, 3, . . . n), y can be any integer (i.e. 1, 2, 3 . . . n), and z can be any integer (i.e. 1, 2, 3, . . . n).

$$(\equiv M'NH_2)_x[M_1(R_1)_b]_y[M_2(R_1)_b]_z \quad \text{Formula 10:}$$

$$(\equiv M'NH_2)_x[M_1(R_1)_b]_y[M_2(R_2)_c]_z \quad \text{Formula 11:}$$

$$(\equiv M'NH_2)_x[M_1(R_1)_b(R_2)_c]_y[M_2(R_1)_b]_z \quad \text{Formula 12:}$$

$$(\equiv M'NH_2)_x[M_1(R_1)_b(R_2)_c]_y[M_2(R_2)_c]_z \quad \text{Formula 13:}$$

$$(\equiv M'NH_2)_x[M_1(R_1)_b(R_2)_c]_y[M_2(R_1)_b(R_2)_c]_z \quad \text{Formula 14:}$$

The bi-metallic catalysts can be treated with hydrogen (as described elsewhere herein) to generate the corresponding bi-metallic hydrides on the same suitable support. One of ordinary skill in the art will appreciate the formulas for the bio-metallic hydride catalysts that correspond to the bi-metallic catalysts described herein and within the scope of the present disclosure.

Methods of Making Bi-Metallic Catalysts

The bi-metallic catalysts can be made according to any of the methods described herein. In view of the description provided herein, one of ordinary skill in the art may be able to generate the bi-metallic catalysts described herein utilizing methods generally known to those in the art. These methods are also within the spirit and scope of the present disclosure. The bi-metallic catalysts described herein can be generated by grafting two different organometallic catalysts on a suitable support. By way of example, Scheme 1 describes the concept of grafting two different organometallic catalysts on a suitable support.

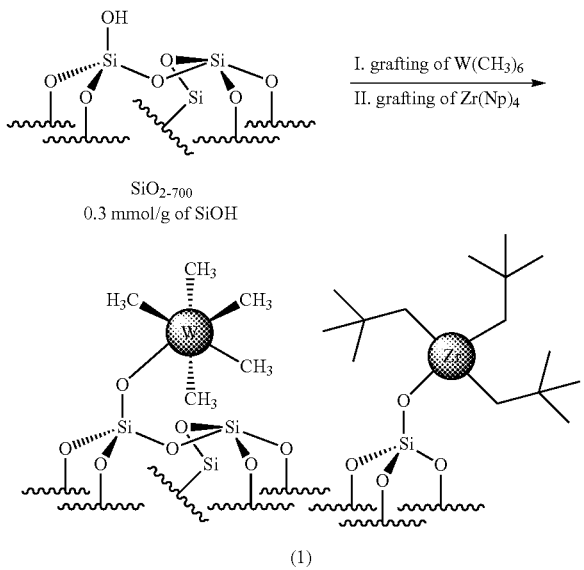

The first step can involve reacting a first organometallic precursor (e.g. a metal alkyl species described elsewhere herein) with a suitable support. (e.g. a metal oxide or aminated oxide support as described elsewhere herein). The first organometallic precursor can be any metal alkyl species described herein. In some embodiments, the first organometallic precursor is a Group VB or VIB metal complex such as a W, Ta, or Mo based organometallic precursor. The W, Ta, or Mo based organometallic precursor can be WMe$_6$, TaMe$_5$, MoMe$_6$, {W(≡C—But)(—CH$_2$—Bu$^t$)$_3$}, {Mo(≡C—But)(—CH$_2$—Bu$^t$)$_3$}, {Ta(═CH—Bu$^t$)(—CH$_2$—But)$_3$}. In some embodiments, the first organometallic compound can include either Wilkinson $d^0$ WMe$_6$ or Schrock type $d^0$ W metal alkylidyne.

The second step can include reacting the material obtained from the first step with a second organometallic precursor, where the second organometallic precursor is different from the first organometallic precursor. The second organometallic precursor can be any metal alkyl species described herein. In some embodiments, the second organometallic precursor can be a Ti, Zr, Hf, or Cr based organometallic complex (e.g. Ti(—CH$_2$—Bu$^t$)$_4$}, {Zr(—CH$_2$—Bu$^t$)$_4$}, {Hf(—CH$_2$—Bu$^t$)$_4$}, {Cr(—CH$_2$—Bu$^t$)$_4$}) and/or metal alkyls of groups IVB and VIB.

Overall, the two different organometallics can be reacted with the suitable support (e.g. a metal oxide) sequentially (i.e. one after the other) and grafting of the organometallics to the support can occur by removing the solvent. The metal oxide or aminated metal oxide can be previously treated between 200° C. and 1000° C. under a vacuum to make isolated —OH groups to allow grafting of the organometallic complexes.

After the two organometallic complexes are grafted to the suitable support to form the bi-metallic catalyst, the bi-metallic catalyst can be treated with hydrogen at about ambient temperature (~20-25° C.) and at about 150° C. to generate the corresponding organometallic hydrides grafted on the same suitable support. Scheme 2 describes the concept of forming the corresponding bi-metallic hydride catalyst.

Scheme 2

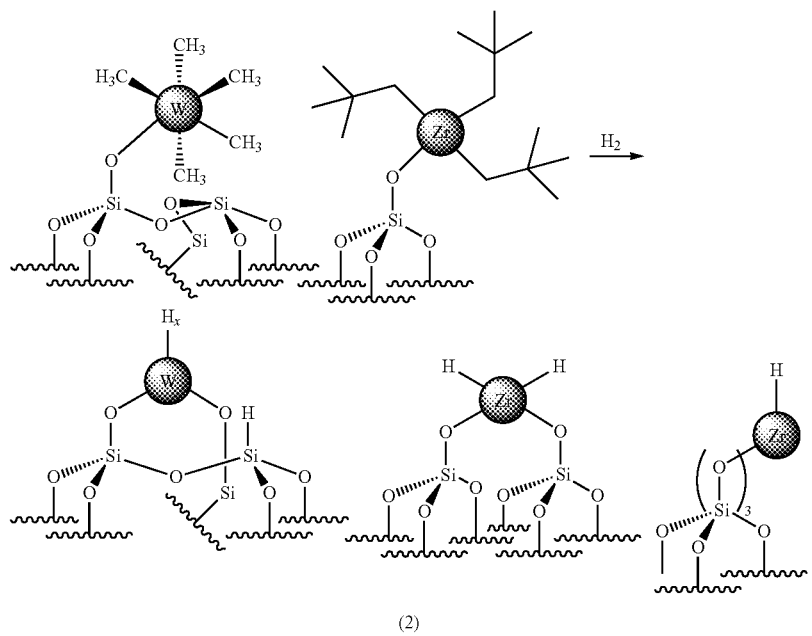

(2)

Uses of the Bi-Metallic and Bi-Metallic Hydride Catalysts

The bi-metallic and bi-metallic hydride catalysts described herein can be used to carry out alkane metathesis reactions. The alkane metathesis reaction can be carried out in a batch or a dynamic reactor. The temperature of alkane metathesis can be about 25° C. and about 150° C. In some embodiments, the temperature of the alkane metathesis reaction can be about 70° C. to about 150° C. The range of the ratio of the amount bi-metallic catalyst or the bi-metallic hydride catalysts added to the hydrocarbon in an alkane metathesis reaction can range from 1:1,000 to about 1:5,000 catalyst:hydrocarbon. In some embodiments, the ratio of the bi-metallic catalyst or the bi-metallic hydride catalysts added to the hydrocarbon in an alkane metathesis reaction can be about 1:5,000 catalyst:hydrocarbon.

In an embodiment, the hydrocarbon used in the alkane metathesis reaction can include saturated and unsaturated hydrocarbons such as $C_1$-$C_{30}$ alkanes, $C_3$-$C_{30}$ alkenes, $C_3$-$C_{30}$ alkynes, and/or a mixture thereof. Each hydrocarbon in the reaction can be linear, branched, cyclic, aromatic, substituted aromatics and/or mixtures thereof. The hydrocarbon can be a $C_1$-$C_{30}$ hydrocarbon such as methane, ethylene, n-butane, isobutane, butene, decane, cyclooctane, 1-decene, 1-decyne, or a combination thereof. In further embodiments, the hydrocarbon can be substituted with a fatty acid ester, ethyl oleate, or ethyl palmitate to form diesters, for example.

The methods and catalysts described herein can be used in the chemical industry, petrochemical industry and pharmaceutical industry. In particular, methods and catalysts of the present disclosure can be used in redistribution of petroleum components. For example, the methods and catalysts described herein can be used in the transformation of alkanes into gasoline, transformation of ethylene to propylene, transformation of butenes to propylene, cleavage of alkanes by methane, cross metathesis of various alkanes, cross metathesis of various alkanes with aromatics or substituted aromatics, transformation of dinitrogen to ammonia, and the like. In regard to the pharmaceutical industry, the methods and catalysts described herein can be used in coupling of aromatics by C—C bond formation, metathesis of functionalized alkanes, cross metathesis of functionalized alkanes with alkanes or cycloalkanes, and obtention of cyclic alkanes or functionalized cyclic alkanes. In regard to the chemical industry, the methods and catalysts described herein can be used in reactions with alkanes, aromatics, or olefins. In particular, the catalytic reaction is active in olefin metathesis, conversion of ethylene or butenes (or their mixture) to propylene, and in the transformation of alkanes like butanes to gasoline.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1

A solution of WMe$_6$ in pentane can be produced as described in Shortian. A, Wilkinso. G, *J. Chem. Soc. Chem. Comm.* 1972, 318, and can be grafted on silica as shown in Scheme 3 by surface organometallic chemistry approach (M. K. Samantaray, E. Callens, E. Abou-Hamad, A. J. Rossini, C. M. Widdifield, R. Dey, L. Emsley, J. M. Basset, *J. Am. Chem. Soc.* 2014, 136, 1054-1061). Scheme 3 demonstrates the generation of WMe$_5$-SiO$_{2\text{-}700}$ catalysts (3) by the grafting of WMe$_6$ on SiO$_{2\text{-}700}$.

Scheme 3

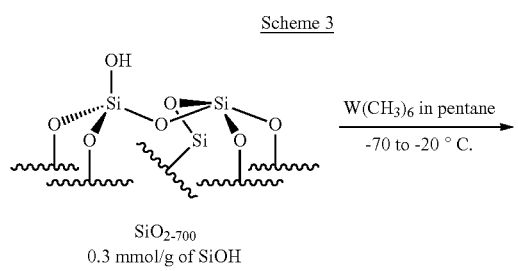

SiO$_{2\text{-}700}$
0.3 mmol/g of SiOH

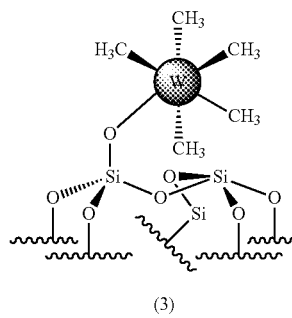

(3)

n-decane metathesis was then carried out with product (3) at about 150° C. with catalyst to n-decane ratio was 1/1000 (FIG. 2) The resulting TON was achieved: 150.

Example 2

ZrNp$_4$ was sublimed on silica$_{-700}$ by classical impreganion using an SOMC technique as demonstrated in Scheme 4. Scheme 4 shows the generation of ZrNp$_3$—SiO$_{2\text{-}700}$ catalysts (product (4)) by the grafting of ZrNp$_4$ on SiO$_{2\text{-}700}$ The grafted complex was treted at about 150° C. under hydrogen before carrying out a metathesis reaction. The amount of Zr on the support was about 3% (wt %). n-decane metathesis was carried out with product (4) at about 150° C. The catalyst to n-decane ratio was 1/1000. No reaction was observed even after 5 days.

Scheme 4

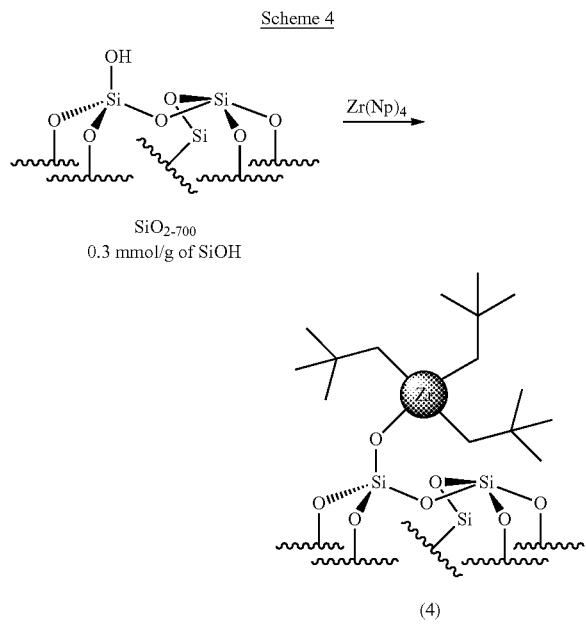

Figure 3:
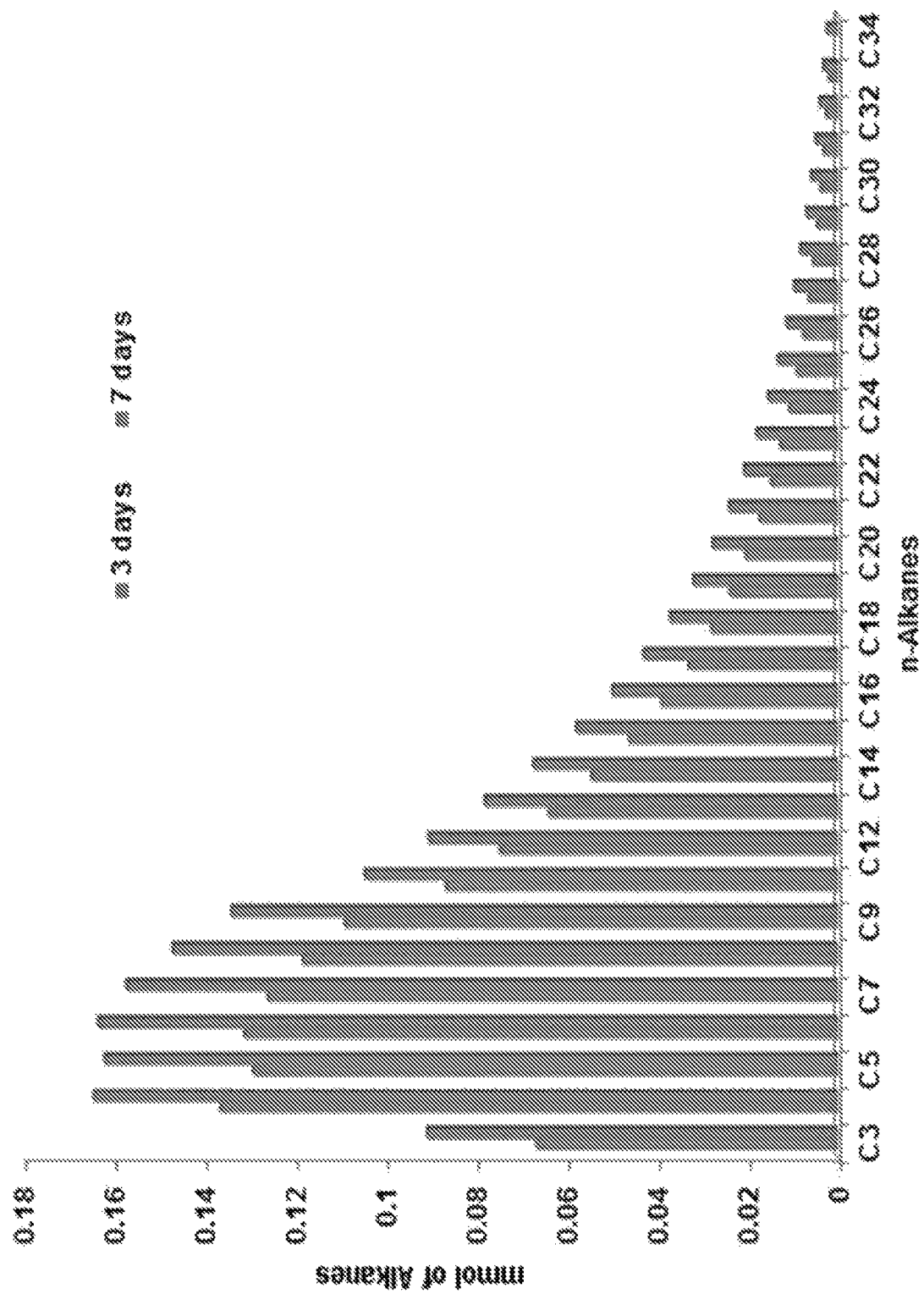
FIG. 3 shows a graph demonstrating the GC chromatography results of n-decane metathesis carried out with a bi-metallic catalyst: WMe$_5$-ZrNp$_3$—SiO$_{2-700}$. The first bar in each grouping of three represents data at 1 day, the second bar in each grouping of three represents data at 3 days, and the third bar in each grouping of 3 represents data at 7 days.

Example 3 n-decane metathesis was carried out with bi-metallic catalyst (WMe$_5$-ZrNp$_3$—SiO$_{2\text{-}700}$) (product (1)) at about 150° C. with catalyst to n-decane ratio of 1/1000 (FIG. 3). The resulting TON was achieved: 560. The bi-metallic catalyst produced about 373% more TON than product (3) alone.

Example 4

Figure 4:
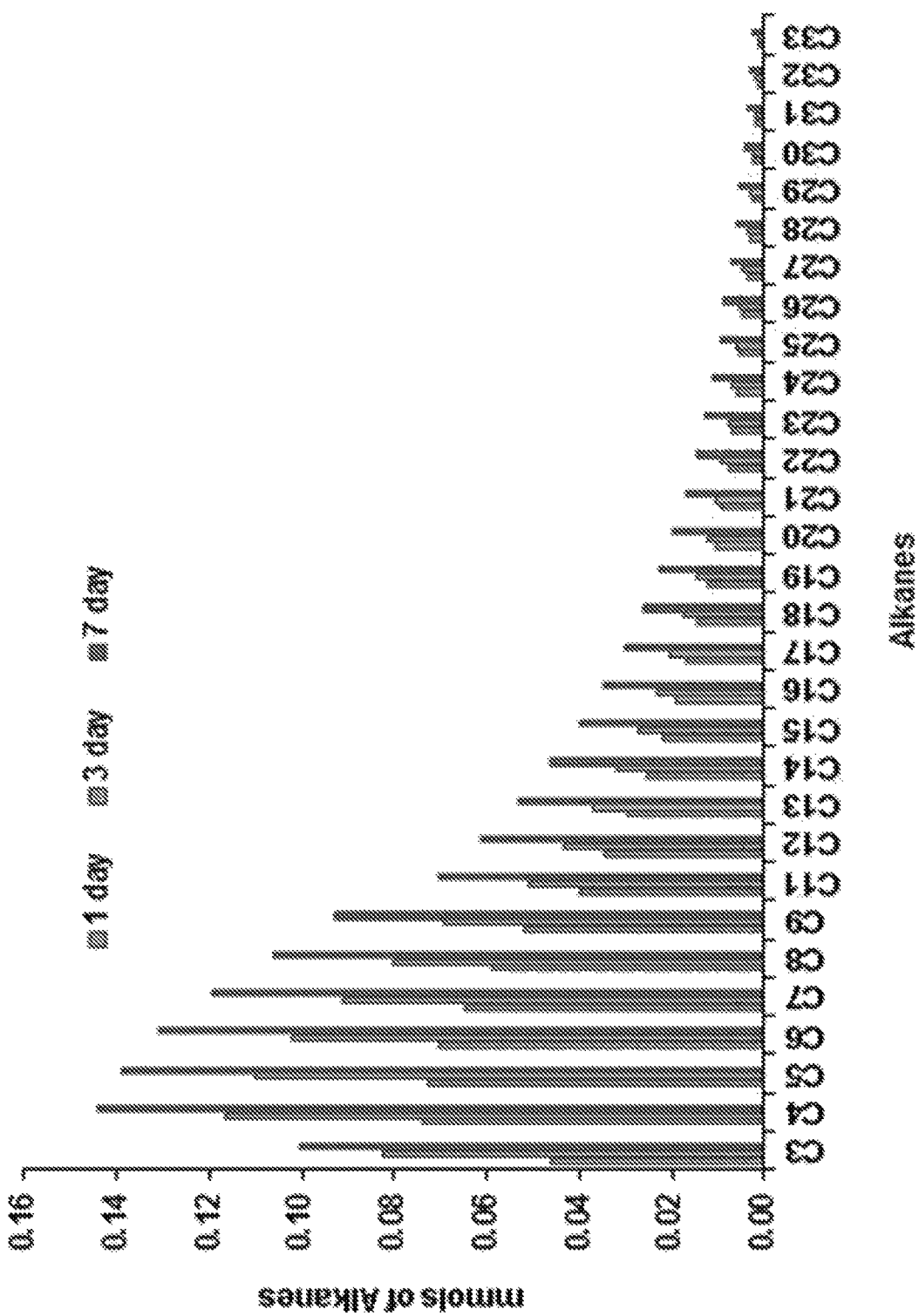
FIG. 4 shows a graph demonstrating the GC chromatography results of n-decane metathesis carried out with [(W)$_x$—SiO$_{2-700}$]. The first bar in each grouping of four represents data at 1 day, the second bar in each grouping of four represents data at 4 days, the third bar in each grouping of four represents data at 5 days, and the fourth bar in each grouping of four represents data at 7 days.

A Tungsten complex (3) was further treated by hydrogen (H$_2$) at about room temperature (25° C.) to generate the corresponding tungsten-hydrides on the silica support (product (5)) according to Scheme 5. n-decane metathesis was carried out with product (5) at 150° C. with catalyst to n-decane ratio was 1/1981 (FIG. 4). The resulting TON was achieved: 543.

Scheme (5)

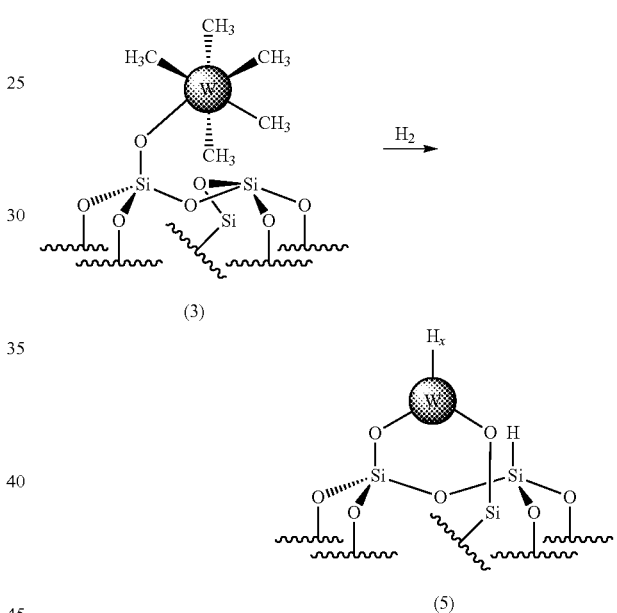

Figure 5:
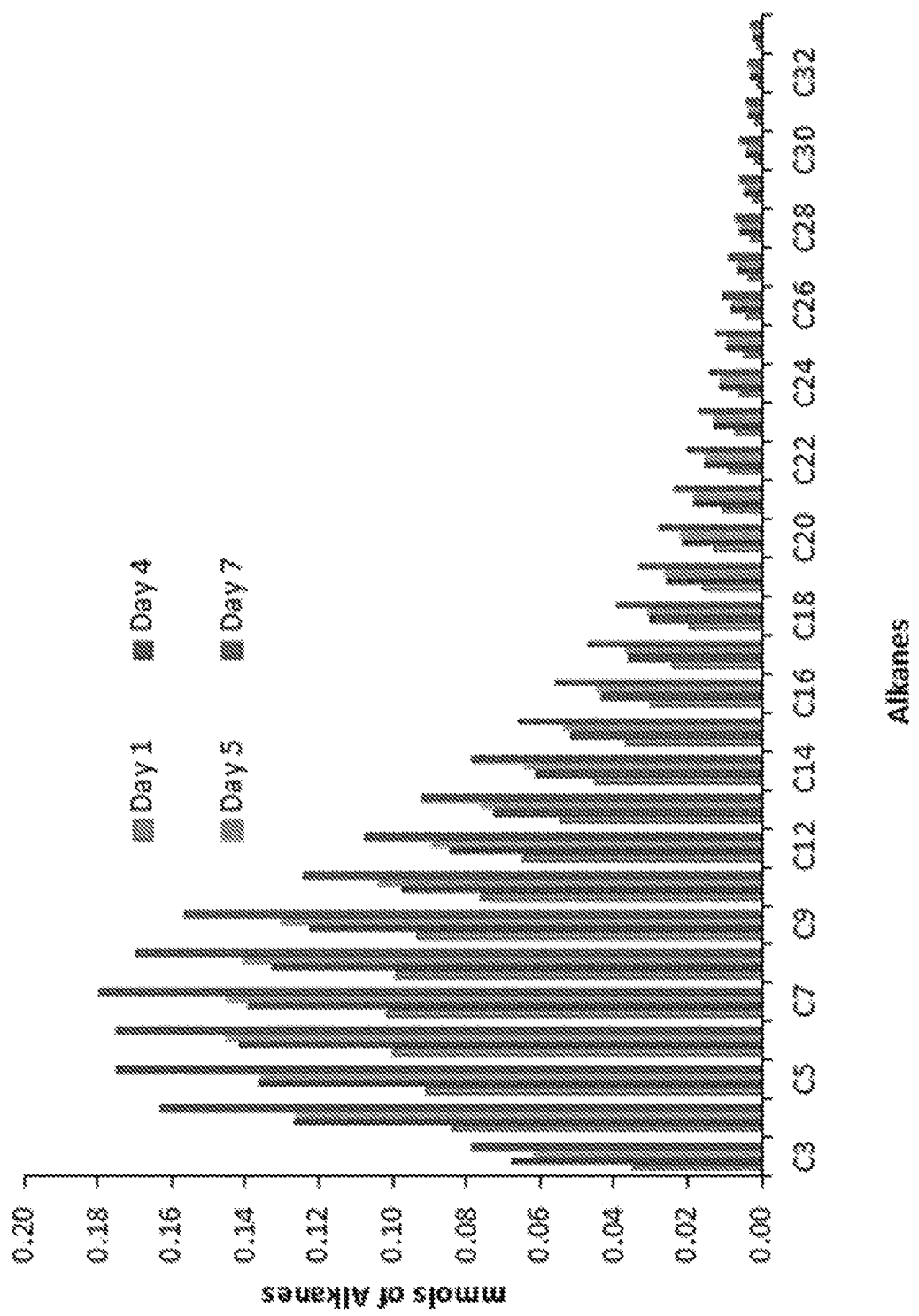
FIG. 5 shows a graph demonstrating the GC chromatography results of n-decane metathesis carried out with a bi-metallic-hydride catalyst (2).
Figure 7A:
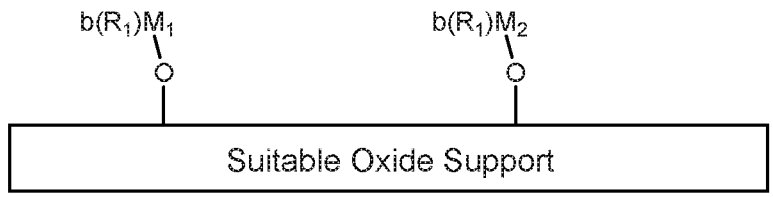
FIGS. 7A-7D show various embodiments of bi-metallic catalysts.
Figure 7B:
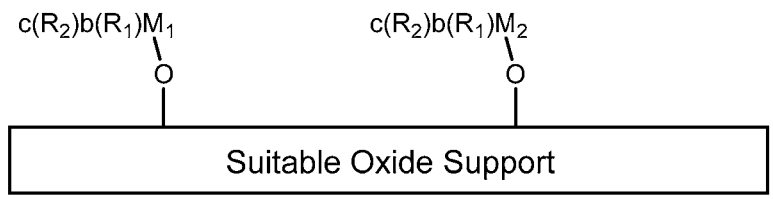
Figure 7C:
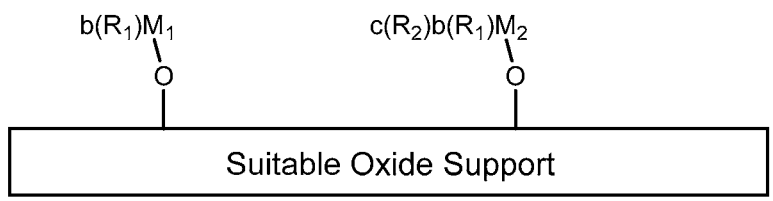
Figure 7D:
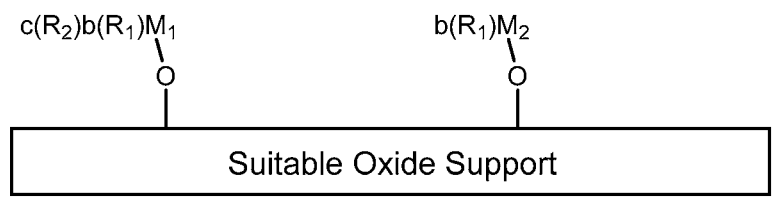

Example 5 n-decane metathesis was carried out with bi-metallic-hydride catalyst (2) at 150° C. with catalyst to n-decane ratio was 1/4005 (FIG. 5). The resulting TON was achieved: 1460. The bi-metallic-hydride catalyst produced about 973% more TON than product (3) alone, producted about 261% more TON than the corresponding non-hydride bi-metallic catalyst (product (1)), and produced about 269% more TON than the hydride single organometallic compound (product 5) alone.

Example 6

Figure 1C:
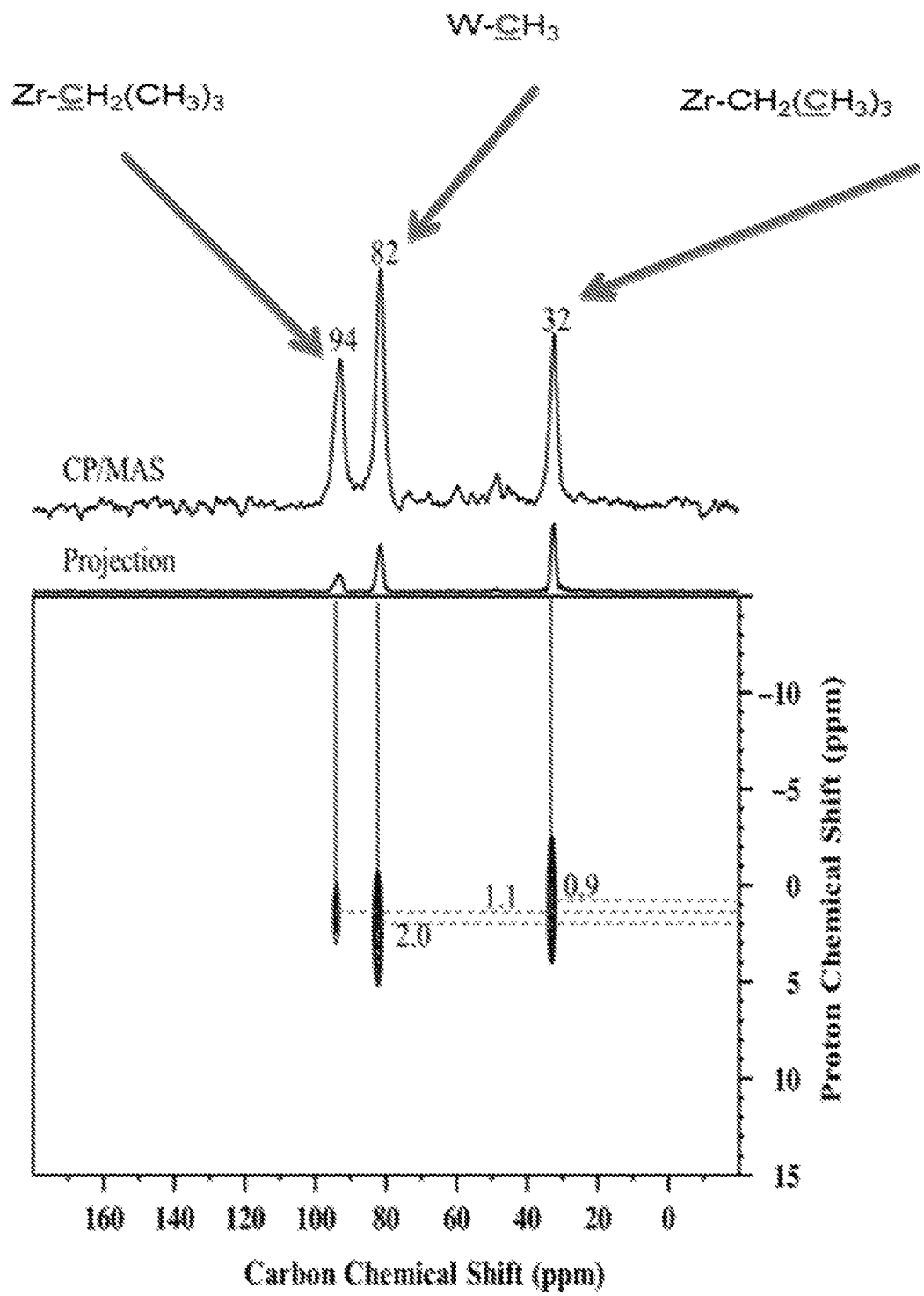
Figure 2:
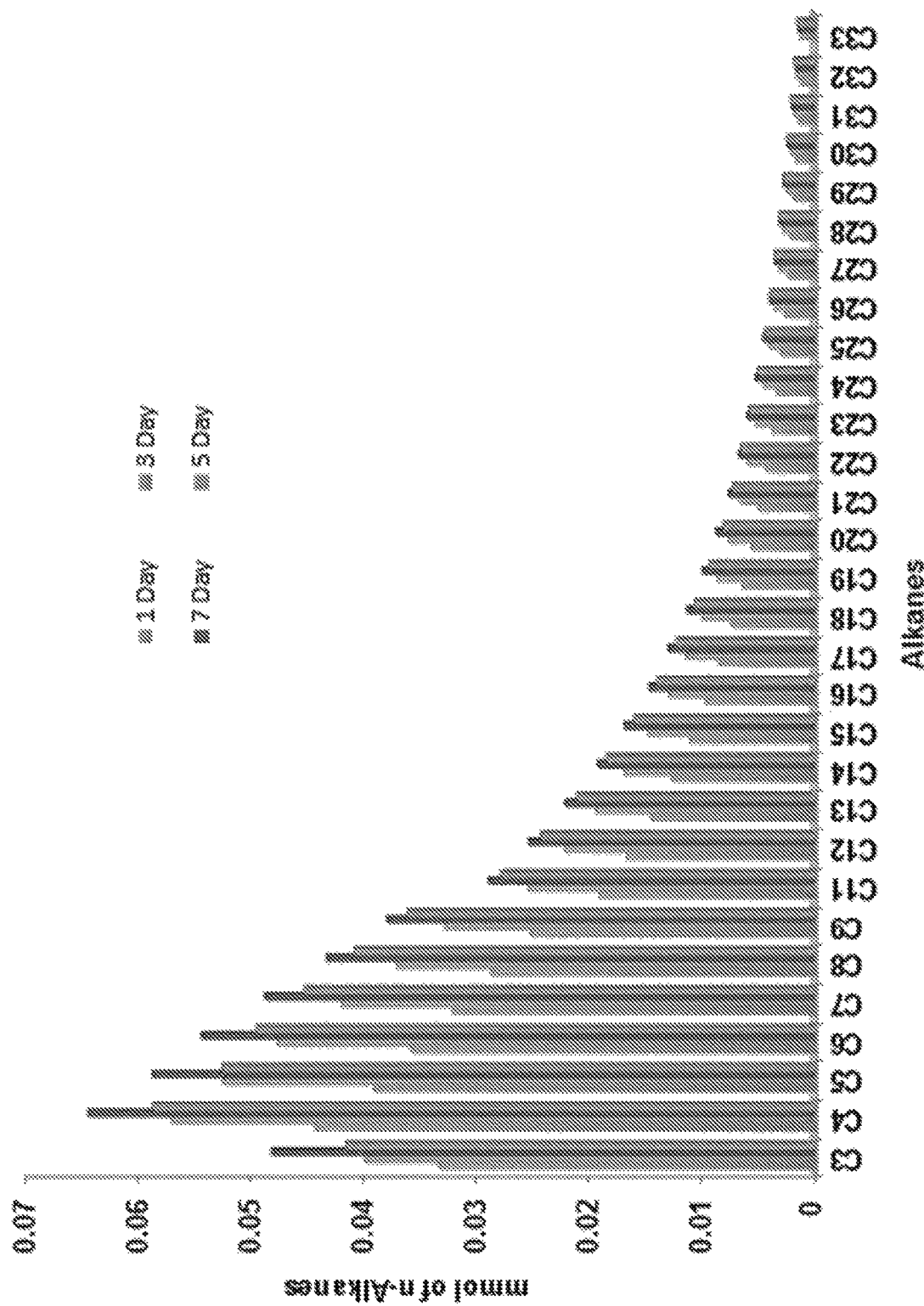
FIG. 2 shows a graph demonstrating the GC chromatography results of n-decane metathesis carried out with WMe$_5$-SiO$_{2-700}$ catalyst. The first bar in each grouping of two represents data at 3 days and the second bar in each grouping of two represents data at 7 days.

This Example sets forth some results associated with the experiments described in Examples 1-5 as well as exemplary catalysts of those described herein. FIGS. 1A-1C show graphs demonstrating the results from NMR characterization for a bi-metallic catalyst ([WMe$_5$] and [ZrNp$_3$] grafted together on a silica surface). The first bar in each grouping of four represents data at 1 day, the second bar in each grouping of four represents data at 3 days, the third bar in each grouping of four represents data at 7 days, and the fourth bar in each grouping of four represents data at 5 days. FIG. 2 shows a graph demonstrating the GC chromatography results of n-decane metathesis carried out with WMe$_5$-SiO$_{2\text{-}700}$ catalyst. The first bar in each grouping of two represents data at 3 days and the second bar in each grouping of two represents data at 7 days. FIG. 3 shows a graph demonstrating the GC chromatography results of n-decane metathesis carried out with a bi-metallic catalyst: WMe$_5$-ZrNp$_3$—SiO$_{2\text{-}700}$. The first bar in each grouping of three represents data at 1 day, the second bar in each grouping of three represents data at 3 days, and the third bar in each grouping of 3 represents data at 7 days. FIG. 4 shows a graph demonstrating the GC chromatography results of n-decane metathesis carried out with [(W)$_x$—SiO$_{2\text{-}700}$]. The first bar in each grouping of four represents data at 1 day, the second bar in each grouping of four represents data at 4 days, the third bar in each grouping of four represents data at 5 days, and the fourth bar in each grouping of four represents data at 7 days. FIG. 5 shows a graph demonstrating the GC chromatography results of n-decane metathesis carried out with a bi-metallic-hydride catalyst (2). FIG. 6 shows a summary of the TONs achieved from alkane metathesis using various catalysts. FIGS. 7A-7D shows various embodiments of bi-metallic catalysts.

We claim:

1. A metathesis method, comprising:
    reacting a hydrocarbon in a presence of a bi-metallic catalyst for hydrocarbon metathesis, wherein the bi-metallic catalyst and the hydrocarbon are present at a ratio within a range of 1:1,000 to 1:5,000;
    wherein the bi-metallic catalyst is selected from the group consisting of at least one of the following bi-metallic catalysts:
    (1) a first bi-metallic catalyst comprising:
        a first organometallic complex containing a Group VI metal and an organic compound selected from the group consisting of alkyl, alkylidene, alkylidyne, bis-alkylidene, and dialkylamide groups;
        a second organometallic complex containing a Group IV metal and an organic compound selected from the group consisting of alkyl, alkylidene, alkylidyne, bis-alkylidene, and dialkylamide groups; and
        a silica support, wherein the first and second organometallic complexes have been grafted onto the silica support; wherein the silica support is a silica that has been pretreated at a temperature between 200-1000° C.;
    (2) a second bi-metallic catalyst formed by treating the first bi-metallic catalyst with hydrogen to form a bi-metallic hydride catalyst comprising a Group VI metal hydride and a Group VI metal hydride grafted onto the silica support.

2. The method of claim 1, wherein the hydrocarbon is an alkane and wherein reacting the hydrocarbon in the presence of the bi-metallic catalyst forms gasoline.

3. The method of claim 1, wherein the hydrocarbon is an ethylene and wherein reacting the hydrocarbon in the presence of the bi-metallic catalyst forms propylene.

4. The method of claim 1, wherein the hydrocarbon is a butene and wherein reacting the hydrocarbon in the presence of the bi-metallic catalyst forms propylene.

5. The method of claim 1, wherein the hydrocarbon is a saturated or unsaturated $C_1$-$C_{30}$ hydrocarbon.

6. The method of claim 1, wherein the hydrocarbon is a linear, branched, cyclic, or aromatic hydrocarbon selected from the group consisting of $C_1$-$C_{30}$ alkanes, $C_2$-$C_{30}$ alkenes, and $C_2$-$C_{30}$ alkynes, or a combination thereof.

7. The method of claim 1, wherein the hydrocarbon is selected from the group consisting of methane, propane, ethylene, n-butane, iso-butane, butene, decane, cyclooctane, 1-decene, and 1-decyne, or a combination thereof.

8. The method of claim 1, wherein the bi-metallic catalyst is the second bi-metallic catalyst.

9. The method of claim 1, wherein the Group VI metal is W, Mo, or Cr, and the Group IV metal is Zr, Ti, or Hf.

10. The method of claim 1, wherein
    the first organometallic complex has a structure represented by formula (Me)$_5$M$_2$, wherein M$_2$ is a Group VI metal selected from the group consisting of W, Mo, and Cr; and
    the second organometallic complex has a structure represented by formula (Neopentyl)$_3$M$_1$, wherein M$_1$ is a Group IV metal selected from the group consisting of Zr, Hf, and Ti.

11. The method of claim 10, wherein M$_2$ is W.

* * * * *